United States Patent [19]
Conwell et al.

[11] Patent Number: 6,163,260
[45] Date of Patent: Dec. 19, 2000

[54] LINERLESS LABEL TRACKING SYSTEM

[75] Inventors: Kevin Girard Conwell, Fairfield; Matthew T. Adams, Cincinnati, both of Ohio

[73] Assignee: Intermec IP Corp., Woodland Hills, Calif.

[21] Appl. No.: 09/209,230

[22] Filed: Dec. 10, 1998

[51] Int. Cl.⁷ .................................................. G08B 13/187
[52] U.S. Cl. .................................... 340/572.8; 340/572.1; 340/572.9
[58] Field of Search ............................. 340/572.1, 572.8, 340/572.9

[56] References Cited

U.S. PATENT DOCUMENTS

| | | | |
|---|---|---|---|
| 5,280,159 | 1/1994 | Schultz et al. | 235/382 |
| 5,497,140 | 3/1996 | Tuttle | 340/825.32 |
| 5,574,470 | 11/1996 | De Vall | 343/895 |
| 5,708,419 | 1/1998 | Isaacson et al. | 340/572.5 |
| 5,955,949 | 9/1999 | Cocita | 340/572.1 |
| 5,982,284 | 11/1999 | Baldwin et al. | 340/572.8 |
| 6,031,458 | 2/2000 | Jacobsen et al. | 340/572.1 |
| 6,045,652 | 4/2000 | Tuttle et al. | 156/292 |

*Primary Examiner*—Glen Swann
*Attorney, Agent, or Firm*—O'Melveny & Myers LLP

[57] ABSTRACT

A linerless label tracking system enables the tracking and identification of items such as airline baggage or delivery parcels at any point prior to their destination. The linerless label tracking system consists of an RF transponder which includes a memory for storing data that can be read by a user with conventional reading devices. The RF transponder comprises an antenna and an IC chip and is incorporated into a linerless label. The lineress label comprises an adhesive layer and an outer surface layer onto which indicia can be printed. The adhesive layer further comprises a pressure sensitive material. The outer surface layer comprises a direct thermal label or tag stock (paper, film, or combination). The RF transponder is incorporated into the linerless label in one of many ways and the linerless label is then applied to the item to be tracked.

22 Claims, 2 Drawing Sheets

LINERLESS LABEL TRACKING SYSTEM

BACKGROUND OF THE INVENTION

1. Field of the Invention

The present invention relates to a label tracking system, and more particularly, to a linerless label with a radio frequency transponder embedded therein for identification and tracking purposes.

2. Description of Related Art

In the automatic identification industry, the use of radio frequency (RF) transponders (also known as RF/ID tags) has grown in prominence as a way to track data regarding an object to which the RF/ID tag is affixed. An RF/ID tag generally includes a semiconductor memory in which digital information may be stored, such as an electrically erasable, programmable read-only memory (EEPROMs) or similar electronic device. Under a technique referred to as "backscatter modulation," the RF/ID tags transmit stored data by reflecting varying amounts of an electromagnetic field provided by an RF/ID interrogator by modifying their antenna matching impedances. The RF/ID tags can therefore operate independent of the frequency of the energizing field, and as a result, the interrogator may operate at multiple frequencies so as to avoid radio frequency (RF) interference, such as utilizing frequency hopping spread spectrum modulation techniques. Passive RF/ID tags extract their power from the electromagnetic field provided by the interrogator, while active RF/ID tags include a radio tranceiver and a battery power source which enable them to transmit a signal to a remote reader. While active RF/ID tags have greater range and capacity than passive RF/ID tags, they are also physically larger, more expensive and have a life limited to the capacity of the battery.

Since passive RF/ID tags do not include a radio transceiver, they can be manufactured in very small, light weight and inexpensive units. Passive RF/ID tags are particularly cost effective since they lack a power source. In view of these advantages, passive RF/ID tags can be used in many types of applications in which it is desirable to track information regarding a moving or inaccessible object. One such application is to affix passive RF/ID tags to wrist bands or other items to identify people for security purposes. Another application for passive RF/ID tags is to attach them to express parcel delivery packages and airline baggage so that information regarding their origination and location could be easily identified.

A problem exists in finding an efficient and cost-effective way of attaching the passive RF/ID tags to the items to be inventoried or tracked. Because of their small size, these RF/ID tags have been affixed to standard liner labels and other similar adhesives employing peel-away liners, utilizing the RF/ID tag's tracking properties in a convenient attachable package. Some problems exist, however, with the linered RF/ID systems. Due to the fact that liners must be peeled away before use, environmental and safety issues are raised. After peeling away from the label, the liners must be disposed of, creating extra waste as well as an associated cost of handling. Also, when using portable printers and applying the labels to the selected item after printing, spent liners that are discarded on the ground can cause potential slip and fall situations. Further, the rolls of media with liners for a given diameter produce lless labels than rolls without liners, translating to more downtime for operators to change the rolls. Accordingly, it would be desirable to produce a linerless label tracking system that would incorporate the informational capabilities of a passive RF/ID tag into the convenience and cost-effectiveness of a linerless label.

SUMMARY OF THE INVENTION

The present invention is directed to a label which combines two technologies, linerless labels and passive RF/ID tags. A linerless label stock is typically a direct thermal label or tag stock (paper, film, or a combination of the tvio) with a pressure sensitive (self-stick) adhesive on the backside without a silicone coated release liner for carrying the labels through a printing process. This linerless media is generally produced in self-wound "tape" roll form with a release coating such as silicone on the top surface of the thermal label stock to allow the media with adhesive to easily unwind without blocking. The RF/ID tags are passive radio frequency transponders including an antenna and integrated circuit (IC) with read/write capability used to store data for identification and tracking of articles in many applications such as express parcel delivery, airline baggage handling and security verification. The RF/ID tags can be inserted into, embedded within, or attached to a label stock with pressure sensitive adhesive. The RF/ID tags can also be incorporated into the linerless label by printing the antenna onto the back of the label stock and inserting the IC chip separately. As indicated above, there are several different ways in which the IRF/ID tags can be incorporated into the linerless label stock. These different methods are discussed in detail below.

A more complete understanding of the linerless label tracking system will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

Figure 1:
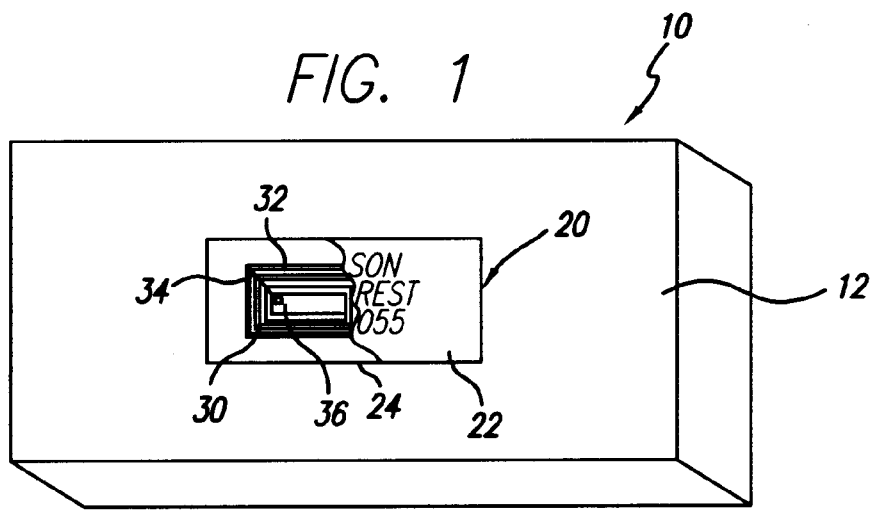
FIG. 1 is a partial perspective view of the linerless label tracking system attached to a parcel.

The present invention satisfies the need for a way to track and identify various items using automatic identification systems by providing a method and apparatus for affixing a radio frequency transponder (RF/ID tag) to a linerless label. In the detailed description that follows, it should be appreciated that like reference numerals are used to describe like elements illustrated in one or more of the figures.

Figure 2:
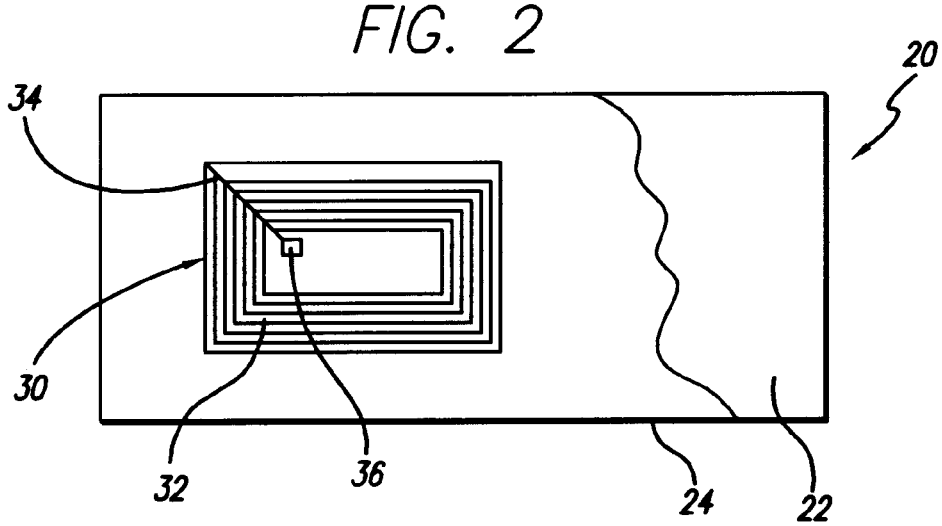
FIG. 2 is an enlarged top view of the linerless label tracking system.

Referring to FIG. 1, a parcel 10 is shown with linerless label tracking system 20 affixed on a surface 12 of a parcel 10 with a label face 22 cut away to show a RF/ID tag 30 that lies underneath. The linerless label tracking system 20 is generally rectangular in shape, approximately 4 inches wide and 6 inches long, and has an exposed label face 22 onto which indicia can be printed thereon using conventional printing techniques. As shown in FIG. 1, alphaneumeric characters are printed on the surface portion 22, but it should be appreciated that alternative types of indicia, such as symbols, logos, and graphics can also be printed onto the surface portion 22. Moreover, the linerless label tracking system 20 is not limited to a rectangular shape, and many alternative shapes can be utilized in a similar manner FIG. 2 shows an enlarged view of the linerless label tracking system 20 with label face 22 partially torn away to reveal the RF/ID tag 30 in its entirety. The RF/ID tag 30 comprises antenna 32 with a return path 34 and IC chip 36. The linerless label tracking system 20 comprises label stock 22 and adhesive 24 in addition to the RF/ID tag 30.

FIGS. 3–8 illustrate the linerless label tracking system in cross-section. The linerless label tracking system 20 comprises two layers of material that are bonded together and a RF/ID tag 30 which is incorporated onto or into one of the layers. An upper layer of label stock 22 comprises paper or film which permits the printing of indicia on the upper exposed surface and a lower layer of adhesive 24. The RF/ID tag 30 has an IC chip 36 which is a semiconductor chip that includes circuitry elements necessary to store and retrieve data, such as memory, as generally known in the art. An antenna 32 is coupled to the IC chip 36 and winds around IC, chip 36 to form a closed loop with the return path 34.

Figure 3:
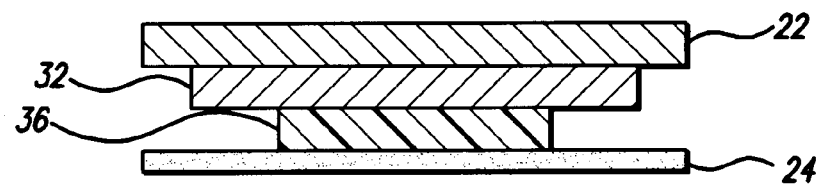
FIG. 3 is a side sectional view of a first embodiment of the linerless label tracking system.
Figure 4:
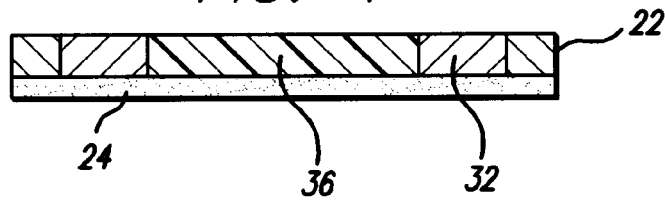
FIG. 4 is a side sectional view of a second embodiment of linerless label tracking system.

Referring now to FIG. 3, a first embodiment of linerless label tracking system 30 is shown. In this first embodiment, antenna 32 is either printed onto the back of label stock 22 or manufactured onto the back side of the label stock 22. LUsing pick and place automation equipment, the IC chip 36 is picked up and placed into each antenna 32 on the label stock 22 so that the IC chip 36 is coupled to antenna 32. Adhesive 24 is then affixed to the label stock, covering the antenna 32 and the IC chip 36. In a second embodiment of the present invention, as shown in FIG. 4, the RF/ID tag 30 (including the antenna 32 and the IC chip 36) is part of the label stock 22. To accomplish the incorporation of the RF/ID tag 30 into the label stock 22, the label could be a composite of layers of film, paper or both. The paper or film would be manufactured so that the RF/ID tag 30 is between the layers. This embodiment would be especially applicable for the use of a linerless label tracking system on airline baggage. Due to the excessive wear and tear on airline baggage, thicker tags are necessary for strength and durability of the tags. Whereas the label stock 22 usually has a thickness of 3–7 mm, a label stock to be used for airline baggage would have to be around 20 mm thick. Thus, additional layers of stock would need to be added to increase the thickness and strength of the tag, making this method preferable. Also, due to the thickness of the label stock 22 in this embodiment, a hole can be punched into the top of the label stock 22 for easy addition of the IC chip 36.

Figure 5:
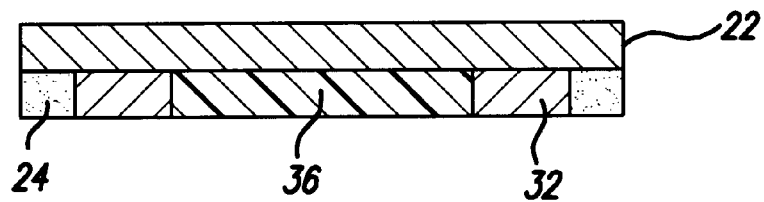
FIG. 5 is a side sectional view of a third embodiment of the linerless label tracking system.
Figure 6:
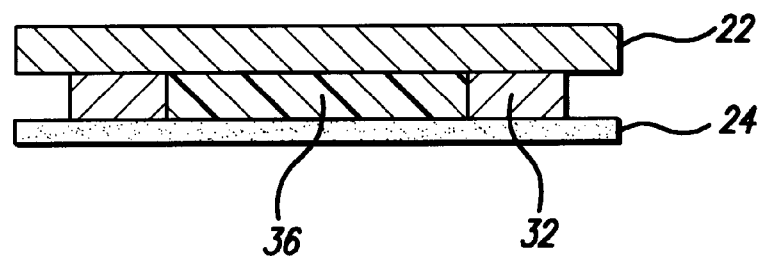
FIG. 6 is a side sectional view of a fourth embodiment of the linerless label tracking system.
Figure 7:
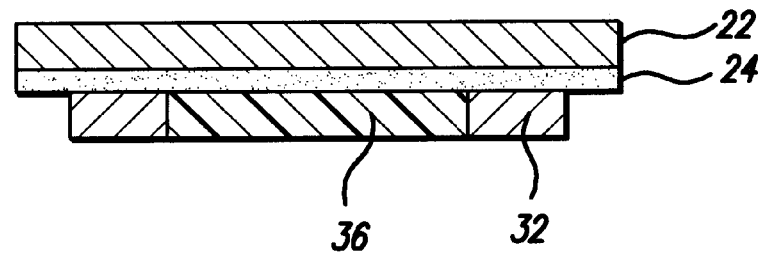
FIG. 7 is a side sectional view of a fifth embodiment of the linerless label tracking system.
Figure 8:
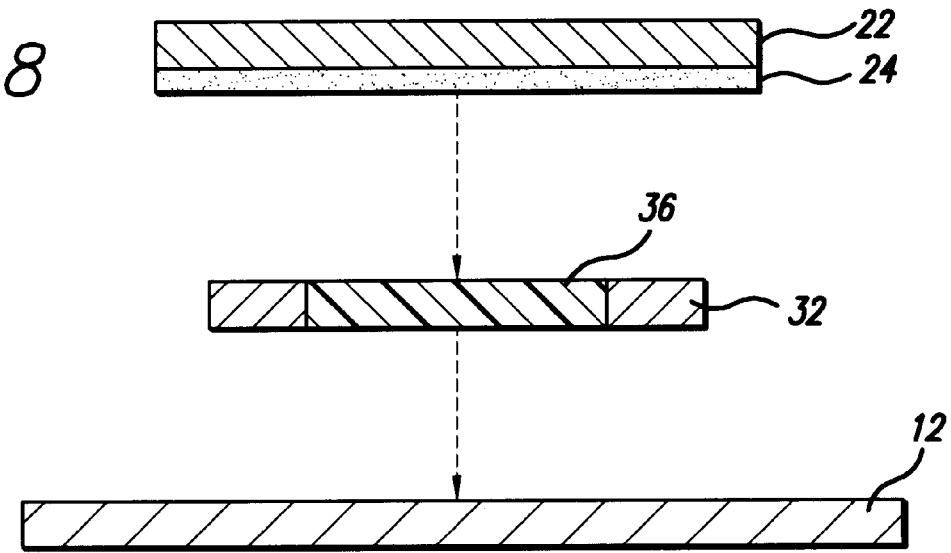
FIG. 8 is a side sectional view of a sixth embodiment of the linerless label tracking system as it is being attached to an item to be identified or tracked.

In a third embodiment of the present invention, shown in FIG. 5, the RF/ID tag 30 is incorporated into the adhesive layer. This is done by the process of laying the adhesive onto the label stock, placing the RF/ID tag 30 onto the adhesive, and laying a second adhesive layer over the RF/ID tag 30. In a fourth embodiment, the RF/ID tag 30 is placed between the label stock 22 and the adhesive layer 24 as shown in FIG. 6. In FIG. 7, a fifth embodiment is shown wherein RF/ID tag 30 is placed onto the adhesive layer 24 after adhesive layer 24 is layed onto label stock 22, thereby leaving the face of the RF/ID tag 30 free of adhesive. Finally, FIG. 8 shows a sixth embodiment of the present invention wherein a lin- erless label consisting of label stock 22 and adhesive layer 24 is produced independently of RF/ID tag 30. The RF/ID tag 30 is affixed to surface 12 of parcel 10 by pressing the linerless label onto surface 12 while the RF/ID tag 30 is disposed between the adhesive layer 24 and the surface 12. This process can take place manually or with automated equipment.

Having thus described preferred embodiments of the linerless label tracking system, it should be apparent to those skilled in the art that certain advantages of the within system have been achieved. It should also be appreciated that various modifications, adaptations, and alternative embodiments thereof may be made within the scope and spirit of the present invention. For example, incorporating a passive RF/ID tag into the linerless label has been illustrated, but it should be apparent that the inventive concepts described above would be equally applicable to active RF/ID tags. In addition, while several embodiments regarding the construction of linerless label tracking system have been presented, other configurations are possible. The invention is further defined by the following claims.

What is claimed is:

1. A data encoding apparatus for identification and tracking, comprising:
    an RF transponder comprising an antenna and an IC chip, said RF transponder including a memory for storing data; and
    a lineress label comprising an adhesive layer and an outer surface, said outer surface further comprising a front side and a back side, wherein said RF transponder is coupled to said adhesive layer.

2. The data encoding apparatus of claim 1, wherein said adhesive layer comprises a pressure sensitive material.

3. The data encoding apparatus of claim 1, wherein said outer surface comprises tag stock material, wherein said tag stock comprises one of a paper, a film, and a paper/film combination.

4. The data encoding apparatus of claim 1, wherein said front side of said outer surface is adapted for printing indicia thereon.

5. The data encoding apparatus of claim 1, wherein said RF transponder is disposed between said adhesive layer and said outer surface.

6. The data encoding apparatus of claim 1, wherein said outer surface comprises a plurality of layers.

7. The data encoding apparatus of claim 6 wherein said RF transponder is disposed between said plurality of layers of said outer surface.

8. The data encoding apparatus of claim 1, wherein said adhesive layer comprises a plurality of layers.

9. The data encoding apparatus of claim 8, wherein said RF transponder is disposed between said plurality of adhesive layers.

10. A method of affixing a data encoding apparatus to an item to be tracked or identified, comprising the steps of:
    providing an RF transponder, comprising an antenna and an IC chip, said RF transponder including a memory for storing data;
    providing a linerless label comprising an adhesive layer and an outer surface, said outer surface comprising a front side and a back side; and
    bonding said label to said item by applying pressure to said front side of said outer surface to affix said lineress label onto said item with said RF transponder disposed between said outer surface and said item, wherein said step of bonding further includes the step of coupling said transponder to said adhesive layer.

11. The method of claim 10, wherein providing a linerless label further comprises providing said adhesive layer including pressure sensitive material.

12. The method of claim 10, wherein providing a linerless label further comprises providing said outer surface including tag stock material comprising one of a paper, a film, or a paper/film combination.

13. The method of claim 10, further comprising printing indicia on said front side of said outer surface.

14. The method of claim 10, wherein said bonding step further comprises disposing said RF transponder between said adhesive layer and said item.

15. The method of claim 10, further comprising disposing said RF transponder between said outer surface and said adhesive layer.

16. The method of claim 10, further comprising printing said antenna onto said back side of said outer surface.

17. The method of claim 10, further comprising affixing said antenna onto said back side of said outer surface.

18. The method of claim 16, further comprising placing said IC chip into said antenna after said printing step, and wherein said adhesive layer is provided over said back side of said outer surface substantially covering said antenna and IC chip.

19. The method of claim 17, further comprising placing said IC chip into said antenna, and wherein said adhesive layer is provided over said back side of said outer surface substantially covering said antenna and IC chip.

20. The method of claim 10, wherein said outer surface further comprises a plurality of layers, and further comprising disposing said RF transponder between said plurality of layers.

21. The method of claim 10, wherein said adhesive layer comprises a plurality of layers, and further comprising disposing said RF transponder between said plurality of layers.

22. A data encoding apparatus formed by the method of claim 10.

* * * * *